Sept. 12, 1950
B. NOBLE
2,522,293
CHARGING CHUTE
Filed Nov. 30, 1948
5 Sheets-Sheet 1
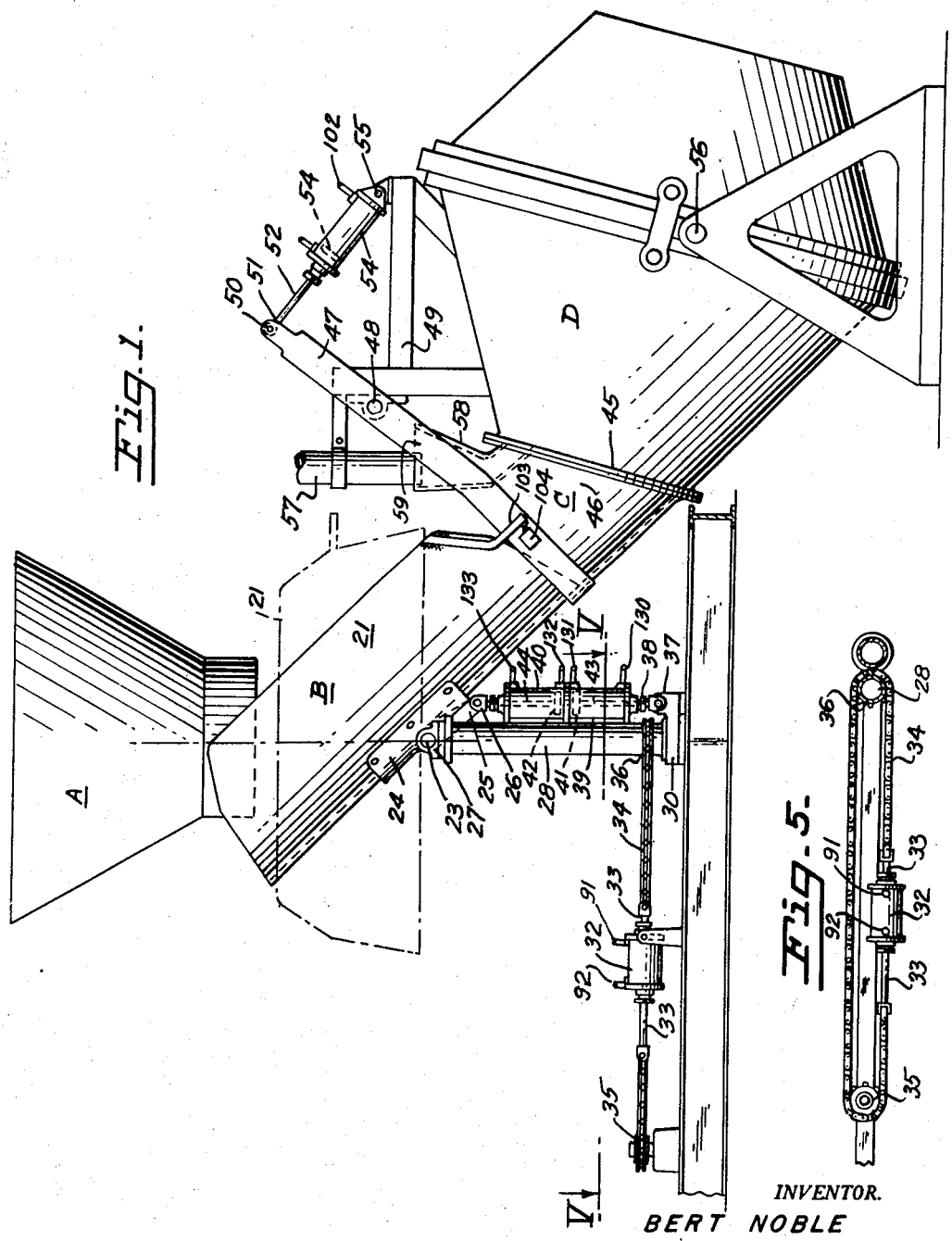
INVENTOR.
BERT NOBLE
BY
A. Graham Owen
ATTORNEY

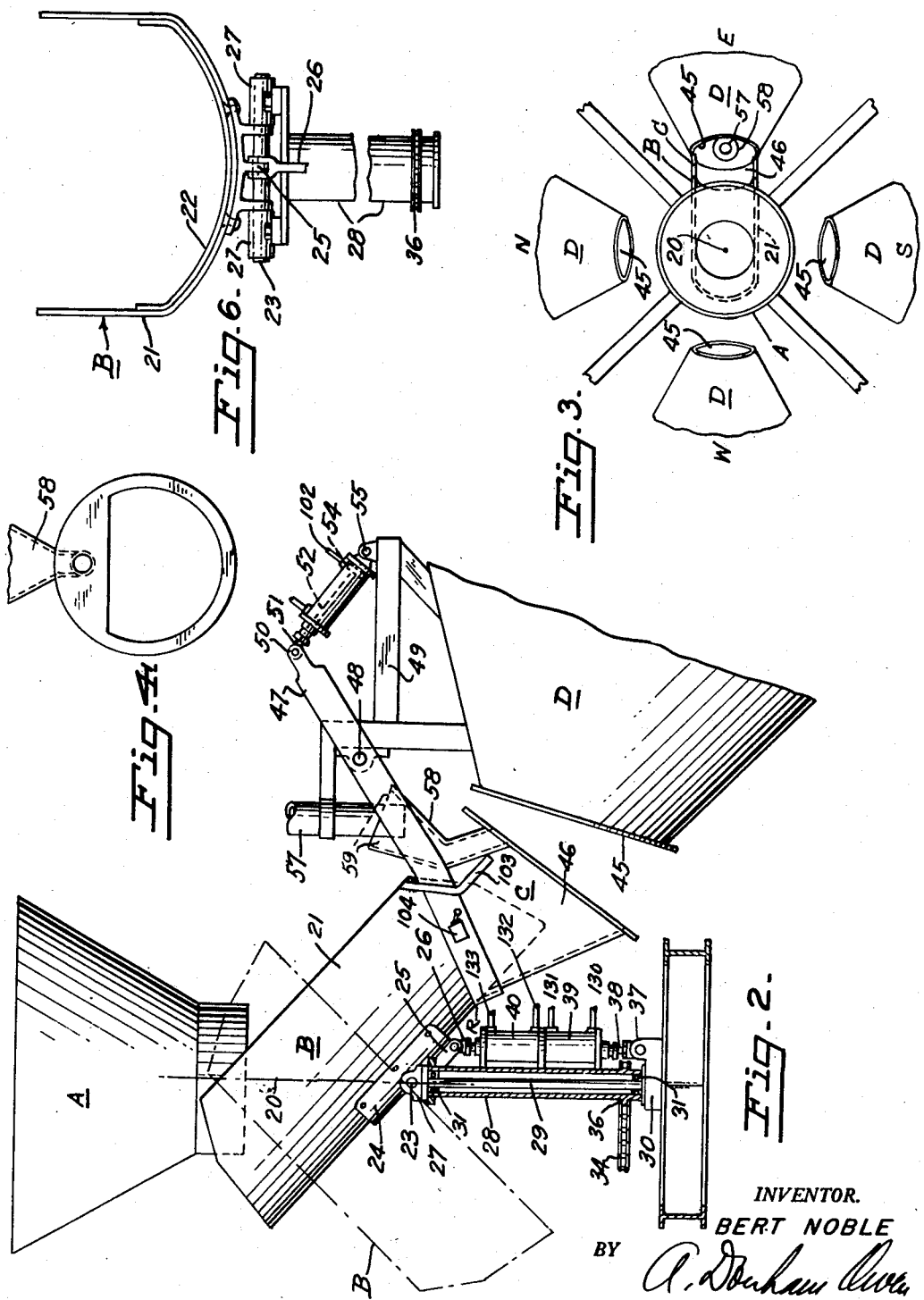

Sept. 12, 1950  B. NOBLE  2,522,293
CHARGING CHUTE
Filed Nov. 30, 1948  5 Sheets-Sheet 3
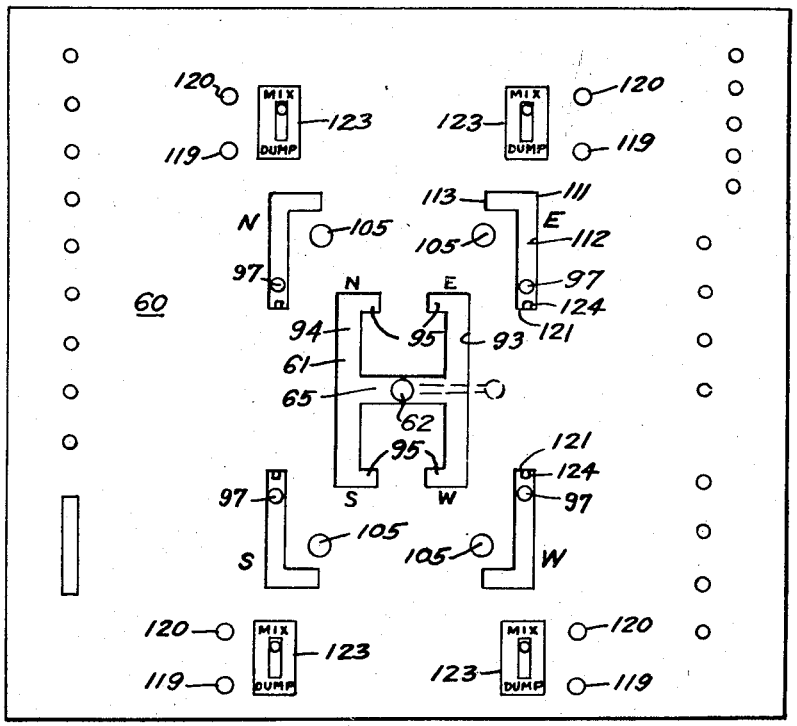
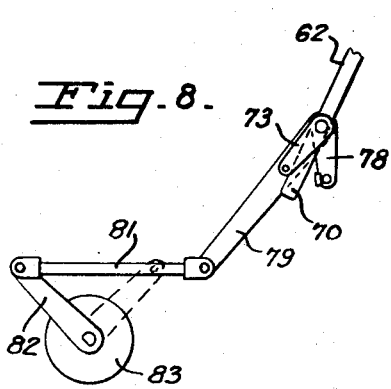
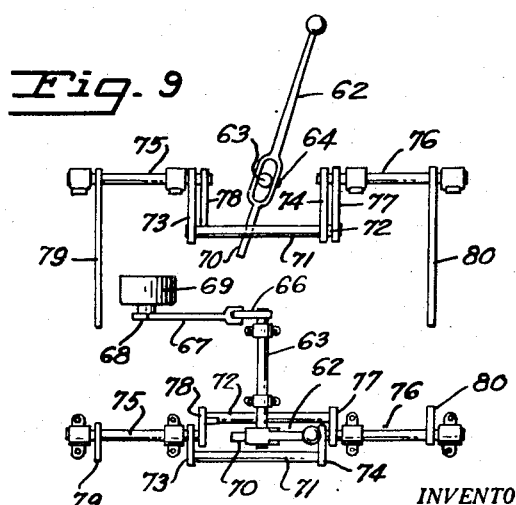
INVENTOR.
BERT NOBLE
BY
ATTORNEY Sept. 12, 1950 B. NOBLE 2,522,293
CHARGING CHUTE Filed Nov. 30, 1948 5 Sheets-Sheet 4

INVENTOR.
BERT NOBLE
BY *A. Dunham Oliver*
ATTORNEY

Sept. 12, 1950  B. NOBLE  2,522,293
CHARGING CHUTE
Filed Nov. 30, 1948  5 Sheets-Sheet 5
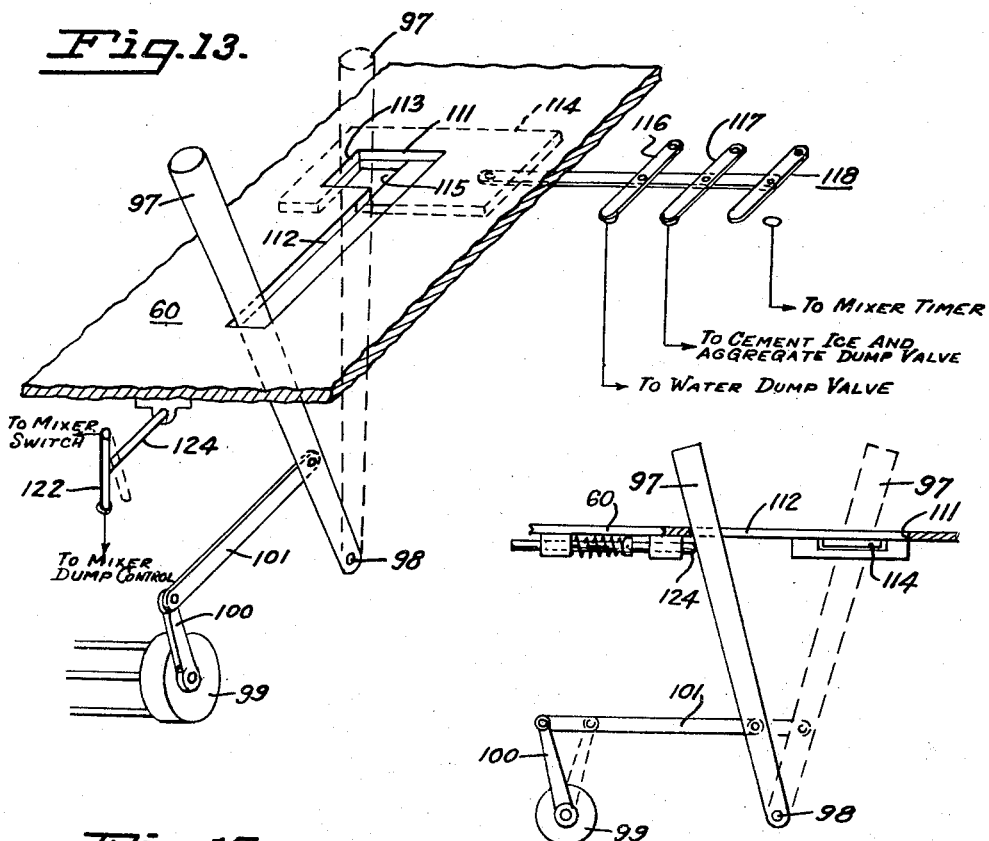
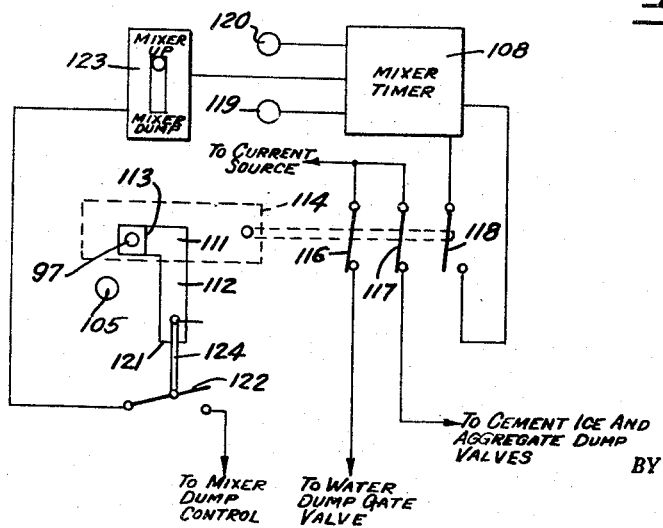
INVENTOR.
BERT NOBLE
BY
ATTORNEY Patented Sept. 12, 1950

2,522,293

UNITED STATES PATENT OFFICE 2,522,293

CHARGING CHUTE

Bert Noble, Winters, Calif.

Application November 30, 1948, Serial No. 62,749

12 Claims. (Cl. 259—152)

This invention relates to charging chutes and is an improvement on chute devices used for directing a pulverulent or a liquid selectively into one of several receptacles.

The invention has application to the handling of many different materials, but for the purpose of illustration it will be described as associated in a concrete batching plant which feeds a plurality of concrete mixers. The usual large concrete batching plant has a bin for each aggregate going into the mix, a weighing means for getting together the required amount of each aggregate for the batch and a plurality of mixers. One batcher can serve several mixers because the mixing time is several times longer than it takes to weigh up a batch for a mixer. Where the present invention is important is in providing a particularly efficient chute mechanism for conveying the aggregates from the batcher to any selected one of the mixers.

Heretofore, the chute most used in this environment had only a single outlet and, therefore, turned a full 360° in reaching the several mixers. The present invention by using a tilting chute only has to rotate 90° (on a four-mixer setup).

Many advantages flow from the present invention. For example, the troublesome indexing problems existing with other devices are done away with and neither the operator nor the mechanism can make a mistake and dump where there is no mixer to receive it. By confining rotation of the chute to 90°, as it is on a four-mixer setup, the chute has just two positions either pointing north and south or east and west and these can be against a positive stop. Fast movement is thus possible. Where the chute must rotate into more than two positions, the movement between mixers has to be slowed down considerably or it will overshoot the mark.

Another advantage of the present device is the simple rugged actuating and control mechanism possible in contrast to the more delicate and sensitive means needed with the prior art machines. Not only is the present device easy to keep in repair, but it is also more foolproof. It can employ simple air rams to effect the positioning of the chute as distinguished from some continuous-drive motor device needed in the prior art machines.

Other advantages will become apparent from the description to follow. This description and the embodiment shown in the drawings is not intended to limit the invention but is an illustration of one form the invention might take as required by U. S. Revised Statutes Section 4888.

In the drawings:

Fig. 1 is a view in elevation showing the chute aligned with the batcher outlet and with one of the mixers;

Fig. 2 is a view similar to Fig. 1, showing the chute in an intermediate position;

Fig. 3 is a diagrammatic plan view showing the receiving and dumping end of the mixers arranged around the batcher outlet;

Fig. 4 is a view in elevation of the end of the auxiliary chute showing also the water inlet;

Fig. 5 is a plan view of the air ram and chain connections to rotate the chute between its two positions;

Fig. 6 is a view in elevation, partly in section, of the chute in the dotted line level position in Fig. 1, and looking from right to left;

Fig. 7 is one form of control panel to house the operating levers of the present device;

Fig. 8 is a view in elevation showing a portion of the control for the tilting of the chute into the E or the W mixer and is taken on the line VIII—VIII of Fig. 11;

Fig. 9 is a view in side elevation showing the mixer selector lever and the linkage it actuates;

Fig. 10 is a plan view of the controls shown in Fig. 9;

Fig. 13 is a diagrammatic showing in perspective of the charging control;

Fig. 14 is a side view in elevation of some of the parts shown in Fig. 13; and

Fig. 15 is a diagrammatic plan view of the E or east section of the control panel.

Figure 11:
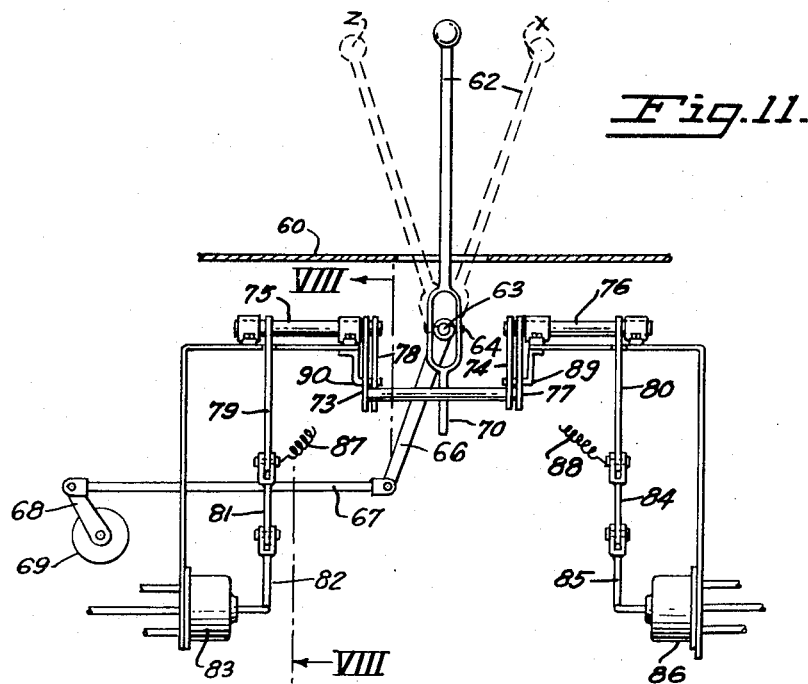
Fig. 11 is a view in elevation similar to Fig. 9, except that the valves are shown.

Looking at Fig. 1, A denotes a hopper below the batcher from which the measured aggregates flow; B denotes the tilting rotatable chute; C the intermediate or auxiliary chute and D the mixer. As shown diagrammatically in Fig. 3, there are several of the mixers D to be fed by the one chute B.

The chute B may be held in a generally level position (see dotted lines in Fig. 1), except when the main control lever is positioned where it has selected a particular mixer to receive the next charge of aggregates. This leaves the chute free to be rotated into a north and south or an east and west position without interference with any of the auxiliary chutes C. It is not essential that the chute be held in a generally level position when being rotated about its vertical axis, so long as the ends of the chute swing clear of any obstructions.

The mixers D (Fig. 3) are spaced around a common center at an equal distance from the center line 20 of the concrete plant and there is the hopper A which collects the aggregates from the various batchers as the latter are discharged. The hopper empties into the charging chute B. Batchers and discharge means on the hopper A are well known devices and are not illustrated here. An improved form of batcher, however, is shown in my co-pending application, Serial No. 78,879, filed February 28, 1949, and would be placed above the hopper A.

The charging chute

The charging chute B consists of a suitably shaped open-topped chute 21, preferably having a renewable line 22, and is mounted on a horizontal shaft 23 which permits it to tilt about 45 degrees to either side of the vertical. A shaped support 24 fastened to the chute bottom has bosses to fit the shaft 23 and another boss 25 offset to receive one end 26 of a shifting ram. The shaft 23 is mounted in bearings 27 secured to the top of a vertical column 28. As shown in Fig. 2, this column is supported in an upright position by an internal column 29 fastened at its base to a supporting frame 30. Antifriction bearings 31 assure easy rotation of column 28 by an air ram 32 whose shaft 33 projects from both its ends where it is secured to the ends of a chain 34. An idler sprocket 35 supports one loop of the chain and a sprocket 36 secured to the column 28 supports the other loop of the chain. In place of the chain drive a link and lever may be connected to the air ram shaft 33 and to the base of the column 28. The travel of the piston in the air cylinder 32 is adjusted to have a fixed stroke so that in one extreme position it rotates the column 28 so the chute B points north and south and in the other extreme position the chute points east and west. In other words, on a four-mixer operation or with two mixers set in the relative position of a north and an east mixer, the chute rotates through 90 degrees.

At the base of the supporting frame, a boss 37 provides support for the end 38 of a shifting ram 39. Where it is desired to be able to hold the chute in a generally level position the shifting ram 39 and the shifting ram 40 have separate rods and pistons and a wall between so that they may be moved independently of each other. Whether both rams are in one unit or are separate units is not important so long as the cylinders are secured together. Piston 41 in the lower ram 39 actuates the rod 43. Piston 42 in the upper ram 40 actuates the rod 44. There is a port with a fitting in each end of each ram through which an actuating fluid preferably air, may be introduced to move the pistons 41 and 42 as desired. The valves which control these air rams will be described later. For the present it is enough to see that when the pistons 41 and 42 are in the position shown in Fig. 1, the chute 21 is tilted to the right about 45°. When air is admitted to move piston 41 down in its ram, this lifts the chute 21 into the level or horizontal position shown in dotted lines. When air is admitted to move piston 42 up in its ram, this tilts the chute 21 to the left about 45° as shown in dotted lines in Fig. 2. In this way the chute may be quickly moved up to the level position and from one mixer mouth to another.

Where a single ram is used to tilt the chute 21, it will have a stroke equal to the combined stroke of the rams 39 and 40. In one position it will tilt the chute to the right so it is about 45° to the horizontal and in its other position it will tilt the chute to the left so it is about 45° to the horizonal.

The auxiliary chute

On the machine illustrated, and due to the tilting movement of each mixer as it dumps a batch of mixed concrete and due to the angle of the charging opening 45 of the mixers, it is preferable to insert an auxiliary chute C between the chute 21 and the mixer mouth. The form shown here in Figs. 1 and 2 comprises a short chute section 46 mounted on a lever arm 47, pivoted at 48 to a frame 49 located above the mixer D. At 50 the arm 47 is connected to the end 51 of a ram rod 52 which is actuated by a double acting piston 53 in the ram 54 connected at 55 to the frame 49. In Fig. 1 the piston 53 is at the upper end of the ram and the auxiliary chute is closed against the mouth 45. In Fig. 2 the piston 53 is retracted in the ram and the auxiliary chute is moved away from the mouth 45 sufficiently for it to clear the chute when the mixer swings down on its pivots 56 to dump the batch.

The auxiliary chute 46 also has provision for directing water into the mixer. A pipe 57 leads from a suitable water batcher into a water hopper 58 which is secured to the chute 46 and is movable with it. The openings 59 on each side of the water hopper provide vents for the air rushing out of the mixer body as the air is displaced by the inrushing aggregates and water.

The controls

The simplicity and rugged nature of the structure thus far described is also characteristic of the controls by which the chute is shifted to convey aggregates from the batcher to any one of the selected mixers. The controls are such that any mechanic can repair them if anything should break and they do not require complicated circuits or relays to effect the operation.

In Fig. 7 is shown a plan view of one form of control panel 60 which is positioned at a convenient height in front of the operator. On the right and left hand edges of the control panel are a series of lights and control buttons which will not be referred to again since they have no bearing on the operation of the charging chute mechanism.

Rotation of the chute

Figure 12:
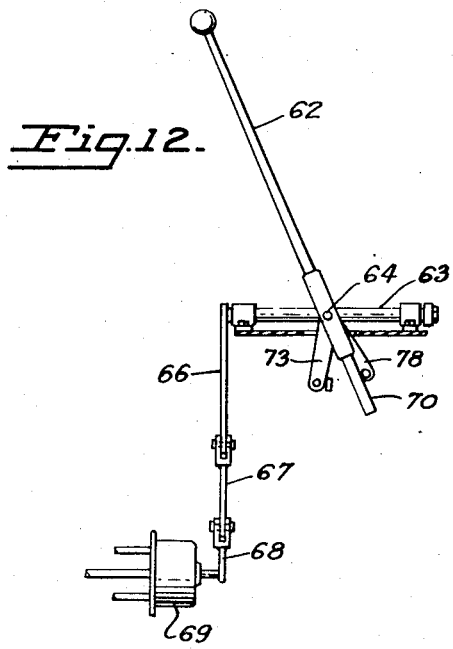
Fig. 12 is a side view in elevation of Fig. 11.

In the center of the panel is an H shaped slot 61 in which slides the mixer-selector control lever 62. This lever is used to select the mixer and to position the chute to feed the aggregate from the hopper to the selected mixer. Assuming that there are four mixers D and that we consider them from now on as being north, south, east, and west, we will give corresponding letters N, S, E, and W to the four corners of the H slot 61 and to the mixers in Fig. 3. The control lever 62 is mounted on a shaft 63 which extends parallel with the N—S and E—W slots in the control panel. The lever 62 is pivoted to the shaft 63 at 64 so that the lever is mounted to move sidewise and fore and aft. Its sidewise movement is shown in dotted lines in Fig. 11 and its fore and aft movement is shown in Fig. 12. Being thus mounted the lever 62 can move across the horizontal slot 65 in the control panel as well as fore and aft in the E—W and N—S slots 93 and 94 respectively.

Movement of the lever 62 from one side to the other in the slot marked 65 actuates the air valve ports which control the ram 32 to swing the chute 21 into either the north and south or the east and west direction. One form of valve connection is shown in Figs. 11 and 12 where the lever 66 is rigidly secured to the shaft 63 to move with it when the shaft is rocked by the lever 62. The pivot 64 which secures the shift control lever 62 to the shaft 63 transmits any sidewise movement of the control lever 62 to the shaft 63 and thence to the lever 66.

The link 67 pivoted to the lever 66 is secured at its other end to the valve arm 68 to actuate the valve 69. The valve 69 controls the admission of air to one end or the other of the ram 32 so as to rotate the column 28 and the chute 21 it supports, ninety degrees.

Tilting of the chute

As shown in Figs. 8, 9, 11 and 12 there is an extension 70 on the lower end of the lever 62 which is adapted to engage the mechanism to control the tilting and the leveling of the chute 21. This mechanism includes a pair of yokes 71 and 72, either of which is adapted to be engaged and moved by the lever extension 70. The yoke 71 is supported on levers 73 and 74—the former being rigidly supported on the yoke shaft 75 and the latter being loosely supported on the end of the yoke shaft 76. The yoke 72 is supported on the links 77 and 78—the former being rigidly supported on the yoke shaft 76 and the latter being loosely hung on the end of the yoke shaft 75. The yoke 71 is rigidly secured to its suspended links 73 and 74 and the yoke 72 is rigidly secured to its suspending links 77 and 78 with the result that when the lever extension 70 is moved and exerts pressure against the yoke 71, movement will be transmitted through the link 73 to rotate the yoke shaft 75. Likewise, when the lever extension 70 engages and moves the yoke 72, this movement will be transmitted through the yoke 77 to rotate the yoke shaft 76. To the yoke shaft 75 is rigidly connected a lever arm 79 and to the yoke shaft 76 is rigidly connected a similar lever arm 80. The links 73 and 78 are spaced far enough from the links 74 and 77 to allow the extension 70 on the control lever to have free sidewise movement corresponding to the amount of movement of the lever 62 in the horizontal slot 65 in the control panel. This is a well known construction and by means of it one lever can be used for effecting several results.

The lever 79 is connected by a link 81 to the valve actuating lever 82 for the air control valve 83. Likewise, the lever 80 is connected by a link 84 to the valve control lever 85 for the valve 86.

The yokes 71 and 72 are held in yieldable position adjacent the lever extension 70 by means of springs 87 and 88. A stop 89 and 90 is arranged directly below the yoke shafts 76 and 77 and projects in between the yoke links 73, 74 and 77 and 78. For example, the spring 87 which is secured to the end of the lever 79 holds the yoke 71 against the stops 89 and 90. When the lever extension 70 is moved against the yoke 71 and moves the yoke away from the stop to actuate the valve 83, the spring 87 will return the yoke 71 to its position against the stop and will close the valve when the shift lever 62 is moved into alignment with the horizontal slot 65 in the control panel. The same thing happens when the lever extension 70 is moved against the yoke 72 and moves the latter to actuate the valve 86. The valve 86 will return to its former position when the lever 62 is moved back to the neutral position which is when it is in alignment with the horizontal slot 65 in the control panel.

Where the chute installation is such that it is not necessary for the chute to come to the level position before being rotated about its vertical axis, the valves 83 and 86 have only a single port, each being connected to opposite ends of the single ram journaled between the bosses 26 and 27 alongside the column 28.

Movement of the control levers

Enough description has been given now to explain in a broad way the control effected by means of the illustrated arrangement. Whenever the shift lever 62 is in alignment with the slot 65 in the control panel, the valve 83 which controls the admission of air to the inlet fittings 130 and 131 on the ram 39 will be in such position that air pressure will be entering the ram through the fitting 131 which will position the chute 21 in its level or dotted line position in Fig. 1. The valve 86 will be in such position that its ports will be admitting air under pressure to the port 133 of the ram 40 so as to hold the piston 42 in the bottom end of the ram.

The sidewise shifting of the control lever 62 as shown in dotted lines in Fig. 11, will effect operation of the valve 69 which controls the entry of air pressure to the fittings 91 and 92 on the ram 32. Thus when the lever 66 is in the position X in Fig. 11, the valve lever 68 will be in the position X and its ports will be admitting air under pressure to the port 91 which will hold the chute 21 in the general E—W position shown in Figs. 1, 2 and 3. When the control lever 62 is moved across the slot 65 into the position Z in Fig. 11, the valve 69 will function to admit fluid pressure to the fitting 92 on the ram 32. This will rotate the column 28 ninety degrees to shift the chute 21 into its N—S position. Summarized briefly, movement of the ram 32 which controls the rotation of the chute 21 through its 90° range of travel is effected by moving the control lever 62 sidewise from one end to the other in the slot 65.

The control effected by movement of the lever 62 after it is in its X or Z position and in line with the E—W slot 93 or the N—S slot 94 determines the tilting of chute 21 toward the particular selected mixer. For example, if the control lever has been moved across the slot 65 and in line with the E—W slot 93, the ram 32 will have positioned the chute 21 in an E—W direction. Now if the lever 62 is moved forward in the slot 93 to its end, this will cause the lever extension 70 to move the yoke 71, which in turn will transmit movement to the valve control lever 82 and arrange the ports in the valve 83 so that air under pressure is admitted through the fitting 130 in the ram 39. This will move the chute 21 downwardly into contact with the auxilary chute C at R in Fig. 2, or if the auxiliary chute had already been lowered into contact with the mixer mouth, the chute 21 would move directly to the position shown in Fig. 1. When the auxiliary chute 46 is not against the mixer mouth, it will interfere with the chute 21, dropping down to its final operative position until the auxiliary chute is moved down against the mixer mouth. An operator may choose either way of operating the device. In order to hold the lever 62 in the east end of the slot 93, a notch 95 is provided in the end of the slot and the lever is moved sidewise into this notch. A similar notch 95 is provided at the ends of the slot 94.

If the control lever 62 had been moved in the opposite direction in the slot 93 or towards the W position, the lever extension 70 would have moved the yoke 72 which would have actuated the valve 86 and its ports would have aligned so as to admit fluid pressure to the fitting 132 on the ram 40. As shown in Fig. 2, this would have caused the chute 21 to incline toward the west mixer as shown in dotted lines. Whenever the operator moves the lever 62 out of the notch 95, the lever will come back into alignment with the slot 65 because the spring 87 or 88, as the case may be, will return the yoke 71 or 72, as the case may be, against the stops 89 and 90 and this will cause the ports in the valves 83 and 86 to admit air under pressure through the fitting 133 in the ram 40 and through the fitting 131 in the ram 39. This will hold the chute 21 in its level or normal position ready if necessary to be shifted 90° by the ram 32. This latter shift is initiated by moving the control lever 62 sidewise from one end of the slot 65 to the other end.

Assuming that the operator has selected the E mixer as the one next to receive a batch of material from the hopper A and that the lever 62 thus is in the notch 95 of the slot 93 at the end marked E, the chute 21 will first assume the position shown in Fig. 2, where it has engaged with the auxiliary chute 46 by contact in the area marked R. The next control to be moved by the operator will be the east charging lever 97. This lever and its connected parts are shown diagrammatically in Figs. 13, 14 and 15. The initial movement of the lever 97, pivoted at 98, is to actuate the valve 99 through its arm 100 and connecting link 101. The valve 99 when thus moved aligns its ports so that the air is introduced to the fitting 102 on the ram 54. This moves the arm 47 and carries the auxiliary chute 46 down against the opening 45 in the mixer. Also it allows the chute 21 to move on down into the full dumping position shown in Fig. 1.

Some operators prefer to position the auxiliary chute 46 against its mixer mouth as soon as the mixer has dumped its batch. They do this by moving the lever 97 to the end 111 in the slot 112, when the mixer has finished dumping its load and is returned ready for another batch. In that case, the chute 21 will move directly into its dumping position upon movement of the lever 62 to the end of either slot 93 or 94.

As the chute 21 moved into this position an arm 103 secured to the chute actuates a limit switch 104 secured to the auxiliary chute which switch, through a suitable circuit, causes the light 105 on the instrument panel to glow. This is a signal to the operator that the chute is aligned and that a batch of aggregates can be passed into the east mixer.

*Dumping into the mixer*

When the lever 97 is in the end 111 of its slot 112, the valve 99 will have actuated the ram 54 and will have moved the auxiliary chute against the mixer mouth. If the light 105 glows the operator knows it is safe to dump the water, ice, aggregates and cement into the east mixer. He does this by means of the same lever 97 by a sidewise movement into the slot 113. Figs. 13, 14 and 15 show diagrammatically a form of apparatus for actuating the dump gates on the batchers, for setting the batchmeter in operation, and for dumping the mixer. This comprises a notched plate 114 slidably mounted on the underside of the control panel 96. The plate has a notch 115 which aligns with the slot 112 when the lever 97 is in the slot 112. When the lever is moved sidewise into the angular slot 113, it is in the notch 115 and carries the sliding plate 114 with it. This closes the switches 116 and 117 which through suitable circuits actuates the valves for the dump gates on the batchers. When the dumping is completed, the operator moves the lever 97 back into alignment with the slot 112 and this closes a switch 118 which (a) sets in operation the batchmeter or mixer timer 108 and (b) lights a red light 119 to indicate that a batch is being mixed. When the batchmeter has run its predetermined time, the red light goes out and a green light 120 goes on. This green light stays on until the operator moves the lever 97 to the end 121 of the slot 112 (a) to move the auxiliary chute 46 away from the mixer mouth and (b) to close a protective switch 122 which completes the circuit to the mixer dumping switch 123. A switch actuating rod 124 or other means may be used to project into the slot 112 near its end 121 so as to be engaged by the lever 97 when it is in that end of the slot and switch 122 is thereby closed. Then when the dumping switch 123 is moved by the operator to the "mixer dump" position, the mixer tilts and discharges the mixed batch of concrete. Then the operator moves the dumping switch to the "mixer-up" position and the mixer is tilted back up ready to receive another batch.

The preferred operation is then for the operator at the first opportunity to move the lever 97 to the end 111 of the slot 112 and thereby bring the auxiliary chute 46 against the mixer mouth ready for the next cycle on that mixer.

The mixer timer is shown diagrammatically at 108 and the switch which initiates its operation is shown similarly at 118.

If the next batch is to be dumped into the W mixer, the operator moves the lever 62 into the W end of the slot 93 which tilts the chute 21 into contact with the auxiliary chute 46 of the W mixer and the cycle is repeated just as described above in connection with the E mixer. The elements shown diagrammatically in Figs. 13, 14 and 15 are those for the E mixer. A like set exists for each mixer in the plant as shown in Fig. 7.

If the operator desires, after having used the E mixer, to load a batch of aggregates into the N mixer the lever 62 is brought from the right hand to the left hand end of the slot 65 which causes the valve 69 to introduce air under pressure to the fitting 92 in the ram 32, thereby bringing the chute 21 into a general N—S position. From this point on the operation is the same as described above.

To those experienced in this art, the basic simplicity and the foolproof, easily repairable controls of the concrete mixing plant herein described, will be apparent. It is realized that no two manufacturers will construct a device exactly alike and in complying with the statute, it is not intended that the invention be limited to the one form of structure illustrated, except as required by the appended claims.

For example, for purposes of illustration, air rams are shown as one means for rotating the column 28 and for tilting the chute 21. It is understood that other equivalents might be substituted, such as fixed stroke, solenoid magnets, in which case the usual electric wiring and switches to control the solenoids would be substituted for the valves 69, 83 and 86 and the tubing and fittings 130, 131, 132, 133, 91 and 92. The same would also apply to the ram 54 for the auxiliary chute. Such equivalents or others, like hydraulic rams, would function equally well in the combination covered in the claims.

When "horizontal position" of the chute 21 is referred to in the specification or claims, it is meant to include any position in which the end of the chute is clear to swing about a vertical axis and to clear the auxiliary chute, or when it is clear of the mouth of the mixer in cases where there is no auxiliary chute.

It is also intended that the claims, unless otherwise limited, shall include a single stroke ram for tilting the chute 21 into its two extreme sloping positions, or shall include connecting the valves 83 and 86 so that the pistons in the rams 39 and 40 move substantially simultaneously toward or away from each other whenever actuated. In other words, it is not essential in all modifications of the invention to bring the chute 21 into a horizontal position prior to the 90 degree rotation about its vertical axis.

I claim:

1. In a concrete mixing plant the combination of a plurality of mixers positioned about a central axis and each having its inlet-outlet mouth facing said central axis; a batch hopper above said mixers and in general alignment with said axis; a conveyor chute mounted beneath said hopper and connectible by tilting it toward any one of said mouths, said chute comprising a trough open at both ends and tiltable in each direction about a central mounting; control means including a pair of independently movable fixed-stroke actuators for holding said chute in a level position and for tilting either end downwardly to align with one of said mouths; and rotating means including a fixed-stroke actuator to shift said chute when in a level position the distance between any two adjacent mixer mouths, whereby said chute may be held in one of two vertical planes for tilting movement.

2. In a concrete mixing plant the combination of a plurality of mixers positioned about a central axis and each having its inlet-outlet mouth facing said central axis; a batch hopper above said mixers and in general alignment with said axis; a mixer mouth extension mounted adjacent each mixer and movable toward and away from said mouth; a conveyor chute mounted beneath said hopper and connectible by tilting it toward any one of said mouth extensions, said chute comprising a trough open at both ends and tiltable in each direction about a central mounting; control means, including a pair of independently movable fixed-stroke actuators, for holding said chute in a position to swing clear of said mouth extensions and for tilting either end downwardly to align with one of said mouth extensions; and rotating means including a fixed-stroke actuator for shifting said chute when in a free position the distance between any two adjacent mixers, whereby said chute may be held in one of the two vertical planes for tilting movement.

3. A feeding means common to several receptacles which are evenly spaced around a central axis and which feeding means is adapted to receive material from a central outlet and to convey it into any selected one of said receptacles, said feeding means including a tiltable open-ended chute mounted on a vertically pivoted frame, actuating means for rotating said frame and chute between two adjacent receptacles, and means for supporting said chute in a generally horizontal position during rotation and for tilting said chute into one of two directions after rotation, said last-named-means including a pair of hydraulically actuated elements with control means for obtaining three different relative positions of said elements, whereby said chute may be set in a generally horizontal position or tipped to either side of said position.

4. A multiple-direction, selective-feed chute-mechanism adapted to convey material from a central dump hopper into any one of a plurality of receptacles with their inlets arranged around a common center, which mechanism includes in combination a vertical column rotatably mounted substantially in alignment with said common center; a fixed stroke power unit coupled to said column to rotate it between two predetermined positions; a chute tiltably mounted in bearings at the upper end of said column, said chute having also on its underside a bearing which is offset and in a plane normal to the tilting axis of the chute; and a fixed stroke power unit journaled at one end in said last named bearing and at its other end to a bearing on said vertical column to tilt said chute.

5. A multiple-direction, selective-feed chute-mechanism adapted to convey material from a central dump hopper into any one of a plurality of receptacles with their inlets arranged around a common center, which mechanism includes in combination a vertical column rotatably mounted substantially in alignment with said common center; a fixed stroke power unit coupled to said column to rotate it between two predetermined positions; a chute tiltably mounted in bearings at the upper end of said column, said chute having also on its underside a bearing which is offset and in a plane normal to the tilting axis of the chute; and a twin fixed stroke power unit journaled at one end in said last named bearing and at its other end to a bearing on said vertical column, to support said chute in a generally horizontal position and to tilt it either side of said horizontal position.

6. The device of claim 5 in which said fixed stroke power unit is a fluid actuated ram and in which said twin fixed-stroke power unit comprises a pair of fluid actuated rams with their pistons adapted to move relatively to each other along the same axis.

7. The device of claim 5 in which said fixed stroke power unit is mounted so that its stroke is transmitted to a chain which passes over a sprocket secured to said column.

8. In a mixing plant having a plurality of open-mouthed concrete mixers arranged around a central zone with a rotatable chute tiltable toward both of its ends for conveying the material to be mixed from a central batcher outlet to a selected one of said mixers, the combination of an auxiliary chute, movable into position between the end of said tilting chute and the mouth of the selected mixer, an electric circuit closed by said auxiliary chute when it comes into operative position, a signal controlled by said electric circuit to indicate its closure, manual control means for then releasing a batch of aggregates so they can flow into said selected mixer through said chutes, and manual control means for moving said chutes away from said mixer upon completion of said flow.

9. In a mixing plant having a plurality of open-mouthed concrete mixers arranged around a central zone with a tiltable rotatable chute for conveying the material to be mixed from a central batcher outlet to a selected one of said mixers, the combination of a signal actuated by said chute when it comes into operative position, manual control means for then releasing a batch of aggregates so they can flow into said selected mixer over said chute, and manual control means for moving said chute away from said mixer upon completion of said flow.

10. The device of claim 8 in which there is an electric circuit closed by the manual control means for releasing a batch of aggregates, a batch timing device actuated by closing said circuit, and signal means operated by said timing device after a predetermined interval of time to signal the operator when the aggregates have been in the mixer for said interval.

11. In a concrete mixing plant the combination of a plurality of mixers positioned about a central axis and each having its inlet-outlet mouth facing said central axis; a batch hopper above said mixers and in general alignment with said axis; a conveyor chute mounted beneath said hopper and connectable with any of said mouths by aligning it rotationally and tilting it toward one of said mouths, said chute comprising a trough open at both ends and tiltable and rotatable about a central mounting, a power unit connected at one end to said trough and at its other end to said central mounting to tilt said chute in either direction, rotating means to shift said chute about said central mounting the distance between any two adjacent mixer mouths, a control lever to actuate said power unit and said rotating means, said control mechanism including a universal mounting for said lever, a pair of actuating means lying alongside said lever and adapted to activate said power unit to tilt said chute when said lever is moved either backward or forward in one plane, and a single actuating means engageable by said lever and adapted to activate said rotating means to rotate said chute, when said lever is moved either way in a direction generally transverse to its movement to effect tilting of said chute.

12. The device of claim 11 in which there is a mixer mouth extension mounted adjacent each mixer and movable toward said mouth to align with said chute when a particular mixer is selected to receive a batch and movable away from said mouth when the mixer has received its batch, power means for moving said extension as aforesaid, and control means for said power means, whereby any selected extension may be moved into position adjacent its mixer mouth before or after said chute has been tilted toward said mouth.

BERT NOBLE.

REFERENCES CITED

The following references are of record in the file of this patent:

UNITED STATES PATENTS

| Number | Name | Date |
|---|---|---|
| 1,724,369 | Rosendahl | Aug. 13, 1929 |
| 2,073,652 | Robb | Mar. 16, 1937 |
| 2,167,243 | Lichlenberg et al. | July 25, 1939 |
| 2,174,089 | Johnson | Sept. 26, 1939 |
| 2,238,342 | Rybeck et al. | Apr. 15, 1941 |
| 2,257,161 | Draeger | Sept. 30, 1941 |
| 2,352,202 | Johnson | June 27, 1944 |
| 2,397,581 | Waters | Apr. 2, 1946 |